(12) United States Patent
Lowry

(10) Patent No.: US 6,418,267 B1
(45) Date of Patent: Jul. 9, 2002

(54) MICRO-DISPLAY DRIVEN TILED ELECTRO-OPTIC DISPLAY APPARATUS

(75) Inventor: Brian C. Lowry, Emlenton, PA (US)

(73) Assignee: MediaPull, Inc., Pittsburgh, PA (US)

( * ) Notice: Subject to any disclaimer, the term of this patent is extended or adjusted under 35 U.S.C. 154(b) by 0 days.

(21) Appl. No.: 09/569,811

(22) Filed: May 12, 2000

Related U.S. Application Data

(63) Continuation-in-part of application No. 09/482,290, filed on Jan. 13, 2000, now Pat. No. 6,304,703.

(51) Int. Cl.[7] .................................................. G02B 6/00
(52) U.S. Cl. ...................... 385/147; 385/115; 385/116; 385/120; 385/121; 385/901
(58) Field of Search ................................ 385/115, 116, 385/120, 121, 147, 136, 137, 901

(56) References Cited

U.S. PATENT DOCUMENTS

| | | | | |
|---|---|---|---|---|
| 3,295,910 A | * | 1/1967 | Hourdiaux | 385/116 X |
| 3,644,922 A | * | 2/1972 | James et al. | 385/116 X |
| 3,815,986 A | * | 6/1974 | Darbee | 385/116 X |
| 4,116,739 A | * | 9/1978 | Glenn | 156/169 |
| 4,650,280 A | * | 3/1987 | Sedlmayr | 385/115 X |
| 5,376,980 A | * | 12/1994 | Gersuk et al. | 353/94 |
| 5,381,502 A | * | 1/1995 | Veligdan | 385/115 |
| 5,400,178 A | * | 3/1995 | Yamada et al. | 359/449 |
| 5,832,168 A | * | 11/1998 | Yenter | 385/147 |
| 6,219,184 B1 | * | 4/2001 | Nagatani | 359/472 |

\* cited by examiner

*Primary Examiner*—Brian Healy
(74) *Attorney, Agent, or Firm*—James M. Singer; Pepper Hamilton LLP

(57) ABSTRACT

An electro-optic display conveys partial images from a plurality of input surfaces to a display surface whose area is greater than or equal to that of the input surfaces together, such that the partial images communicated onto the input surfaces appear as an enlarged single image on the display surface. The display surface is made of tiles that are connected to a structural frame to allow contours. A micro-display communicates with each input surface, each micro-display corresponding in an ordered, one-to-one fashion with a tile of the display surface. The partial images are generated from a single image by an image segmenter.

14 Claims, 7 Drawing Sheets

MICRO-DISPLAY DRIVEN TILED ELECTRO-OPTIC DISPLAY APPARATUS

Continuation-in-part of aaplication Ser. No. 09/482,290 filed Jan. 13, 2000 now U.S. Pat. No. 6,304,703.

BACKGROUND OF THE INVENTION

1. Field of the Invention

Large Screen Displays (LSD's) can be defined as any dynamic display that can be viewed by more than one person and is at least two feet wide. The LSD market is diverse, with many differing products and technologies, each having certain strengths and weaknesses, competing to fill the needs of the end user. Applications requiring outdoor use in direct sunlight have traditionally been served best by CRT/LED displays, while indoor applications may be served by video walls or front/rear projection systems. The CRT/LED systems, while very bright (typically 4k–6k cd/m$^2$), are very expensive, both in terms of initial cost and total cost of ownership, and offer only marginally acceptable resolution. Moreover, they can only be viewed at a distance because of the need for the discrete red, green, and blue (RGB) pixels to optically converge. Thus, they are not cost effective or suitable from either resolution or minimum viewing distance criteria for indoor applications.

Video walls are adequate for indoor use, but are bulky, not very bright (typically less than 500 cd/m$^2$), and suffer from the appearance of mullions between each of the displays that comprise the video wall. Data projectors offer high resolution, yet, because of the relatively long "throw distance" required to project an image and other constraints of projection systems, they are not suitable for many applications.

Fiber optic LSD's offer substantial improvements over current CRT- and LED-based displays, due to their smaller depth, lighter weight, and elimination of sensitive and expensive electronic components on the surface of the display, while delivering superior resolution and adequate brightness for direct sunlight applications. Because there is no RGB convergence in fiber optic displays, the minimum viewing distance is considerably less than that of CRT/LED displays.

Fiber optic displays are superior to video walls because they lack mullions, are brighter, more rugged, and are much thinner. Fiber optic displays have an advantage over projection systems in that the display unit can be easily moved and easily installed.

Clearly, fiber optic displays have compelling advantages over competing technologies. Fiber optical displays, however, are not without shortcomings. In fabricating large displays (e.g., >100 inches diagonal), the cost of optical fiber becomes significant. The long, coherent fiber bundles become increasingly difficult to manage, and the bundles become increasingly susceptible to damage. This becomes particularly problematic when designing immersive LSD systems, such as an interactive gaming environment. The purpose of the present invention is to address these and other shortcomings of current large screen display technology. This application is a continuation in-part of application Ser. No. 09/482,290.

2. Description of Related Art

Several LSD's have been successfully constructed using optical fiber, and modular displays have been patented. However, because of the method by which the modules are joined, as well as the lack of a suitable light-shaping diffusion element at the display surface, current displays cannot be contoured. Moreover, the difficulty and cost of dealing with large fiber bundles still exists. The use of smaller tiles is based upon the concept of a "throw-away" display. In other words, if one or more of the tiles are damaged (e.g., by the impact of a rock or other hard object), they can be discarded and replaced in the field at minimal cost.

U.S. Pat. No. 4,299,447 discloses a transflective, liquid crystal display that utilizes a fused, tapered optical fiber block and front diffuser. This invention has several shortcomings as discussed by the author of U.S. Pat. No. 4,613,210. First, the optical tapers used in this invention are costly to produce in high quantities. Second, the imaging qualities of said tapers are not sufficient to render high quality graphics, as is the intent of the present invention. Because of the fabrication of the tapers, distortion occurs around the periphery of the display surface. Moreover, because of the diffuser plate, the transflective operation of the display would not deliver sufficient light to allow the display to operate under normal viewing conditions.

U.S. Pat. No. 4,613,210 purports to be an improvement to U.S. Pat. No. 4,299,447. This invention uses a monolithic integrated circuit chip that serves as the electro-optic transducer (image source). These integrated circuits are integrated circuit chip that serves as the electro-optic transducer (image source). These integrated circuits are coupled to a conjugate image expander and "recomposer" (depixelizing diffuser sheet). Displays of any size can be made by joining the modules. The author also claims contoured displays, yet offers no description of how to couple or bend the printed circuit boards onto which the transducer chips are attached. The invention described has several inherent problems. First, the electro-optic transducers described are relatively small and derive their power from the printed circuit board to which they are attached. This design does not permit the very high luminous flux levels necessary for viewing in high ambient light conditions. Moreover, the presence of the printed circuit board makes field replacement of the modules difficult. The invention described is comprised of a great many specialized parts and thus does not lend itself to volume production at low cost. The "recomposer" or diffuser in this invention is designed to completely depixelize the image. While this is commendable, it is highly impractical, particularly for high ambient light conditions. It is generally necessary to allow a portion of the display surface to be black or gray in color, so as to enhance the contrast and minimize specular reflection from the display surface.

U.S. Pat. No. 5,465,315 discloses a display comprised of a plurality of display devices. The purpose of this invention is to eliminate the mullions in tiled display systems. The display disclosed is not modular, nor are the fiber optic elements used to enlarge the input image.

U.S. Pat. No. 5,832,168 discloses a fiber optic LSD comprised of adjustable modules. However, only a single input surface is used, rather than a plurality. Moreover, the display is not contourable.

SUMMARY OF THE INVENTION

A novel solution to many of these limitations is the intent of the present invention. A contourable electro-optic display apparatus comprised of a plurality of modular, self-contained tiles is disclosed. Despite the possible contours introduced by the tiles, the display can be viewed from any angle because the luminance from each tile is essentially constant. A design for such an apparatus has been disclosed in applicant's invention with application Ser. No. 09/482, 290, now U.S. Pat. No. 6,304,703. In this particular invention, each tile is driven by its own commercial off-the-shelf (COTS) micro-display. The overall display resolution is multiplied by the number of tiles, making the display ideal for large command and control centers. By locating a micro-display at each tile, the need for a costly data/video projector is averted and the cost for optical fiber is greatly reduced. Moreover, the assembly and maintenance of the display is simplified by eliminating bulky fiber optic bundles. The electronics for driving the micro display matrix are disposed in a separate enclosure remote from the display. Because of the low power consumption of the micro-displays, LSD's could be powered, in one embodiment, by batteries or solar energy, rather than from the power grid.

DESCRIPTION OF INVENTION

Figure 1:
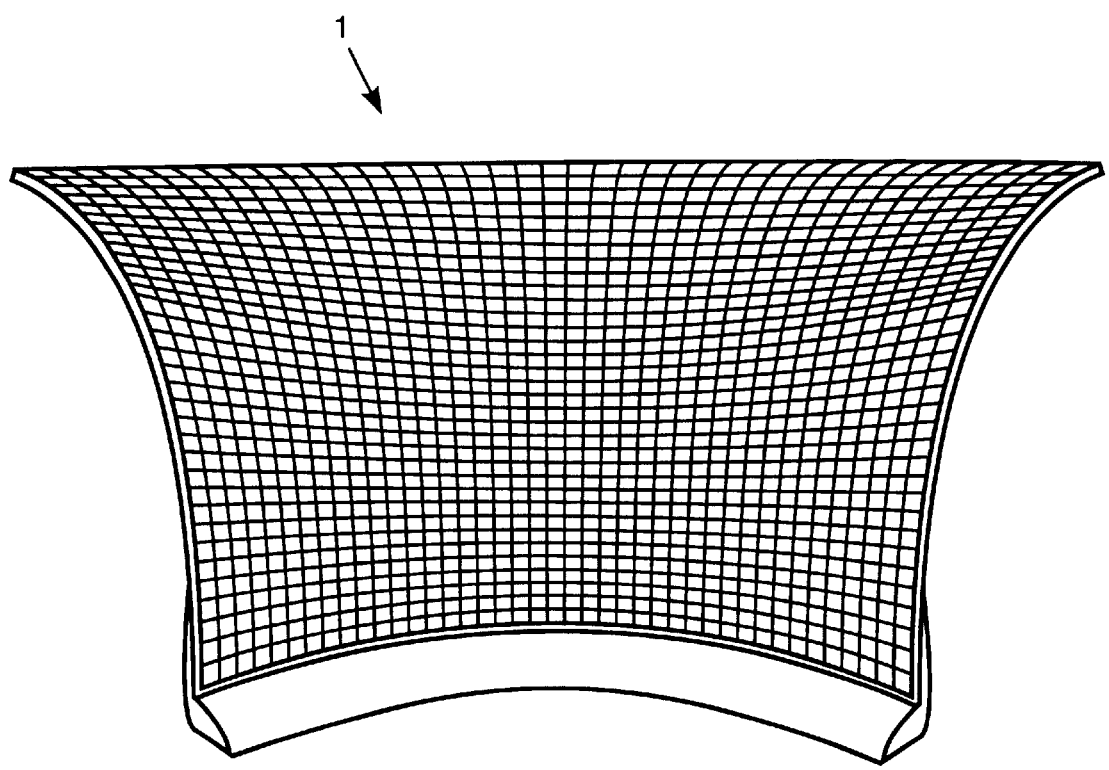
FIG. 1 shows a front view of a contoured electro-optical display (1).
Figure 2A:
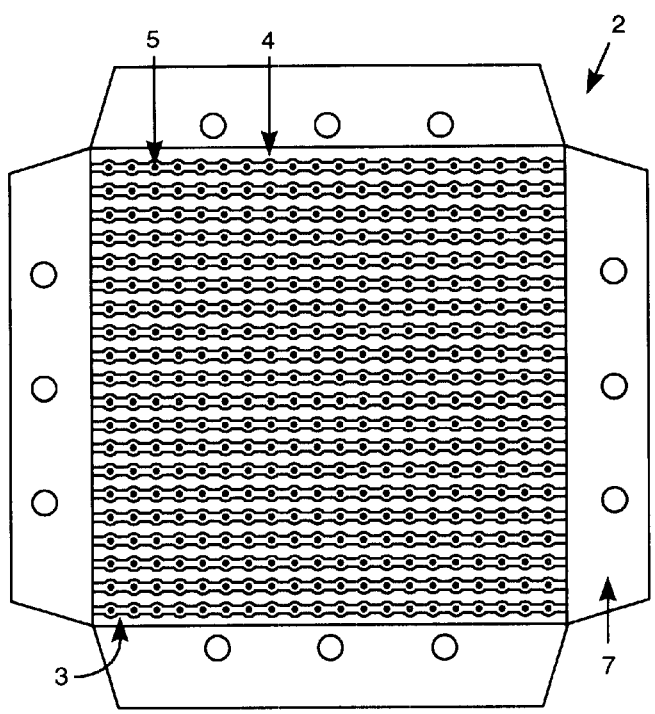
FIG. 2 shows three views of a specific embodiment of the present invention: front (FIG. 2A); side (cut-away) (FIG. 2B); and rear perspective view (FIG. 2C).
Figure 2B:
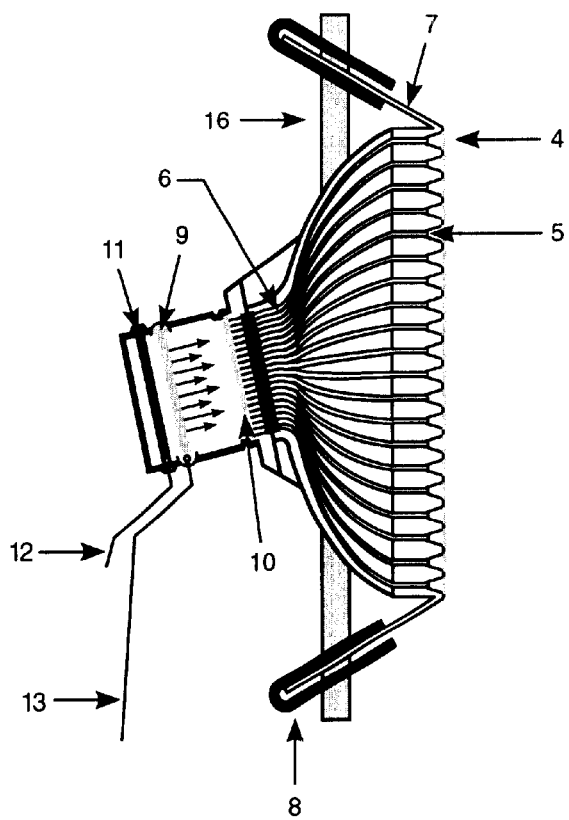
Figure 2C:
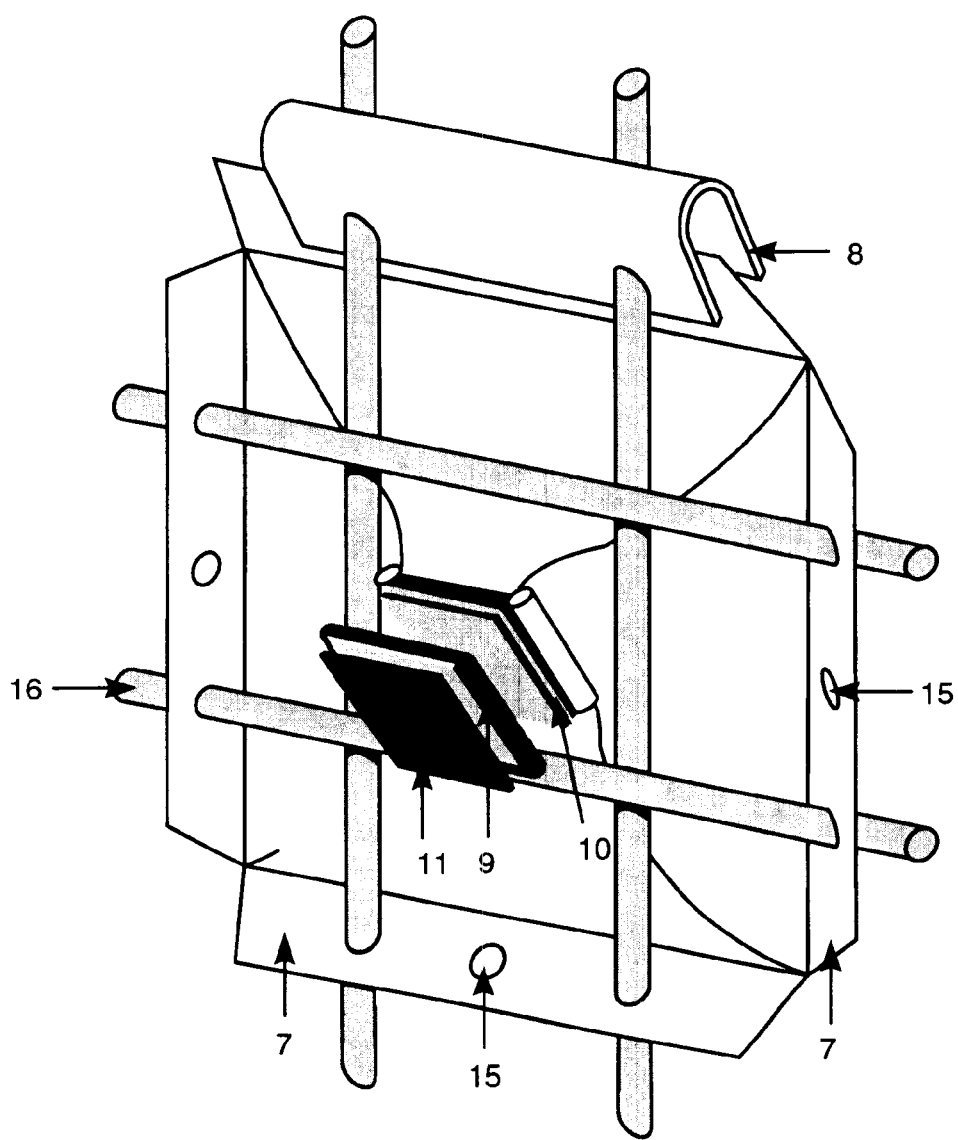

The present invention is an electro-optical display (1) comprised of a matrix or array of tiles (2), as may be viewed in FIG. 1. Each display consists of a plurality of equal-sized tiles (2) adjoined to each other and to a structural frame (14), in rows and columns, and supported by flexible support rods (16), as may be viewed in FIG. 3. In the preferred embodiment, each tile (2) has its own micro-display (9) and illumination device (11) coupled to the rear of the tile (2) for producing an image on the surface of the tile (2), said image being a partial image of the total image on the display (1), as may be viewed in FIGS. 2B and 2C. FIGS. 2A–C, 3, and 4A are referred to in the following description of the display tiles (2). Each display tile (2) is assembled from parts made of injection-molded thermoplastic, ABS, polycarbonate, or other material appropriate to the environmental conditions in which the display will be deployed. The size of each tile (2) is sufficiently small as to allow the radius of curvature required to contour the display in the desired fashion, with smaller tiles (2) allowing a smaller radius (greater curvature). In the specific embodiment disclosed, the tile (2) is comprised of three distinct parts, a front piece, a lower cowl, and an upper cowl, which are snapped and cemented together after the fibers are inserted into the front piece. The display surface (3) of each tile is perforated by a matrix of concave orifices (4) in which the distal fiber optic ends (5) terminate as may be viewed in FIGS. 2A and 2B. The half-angle of the cone must correspond to the numerical aperture (NA) of the fiber used, such that the cone of light emitted from the distal fiber end (5) is not occluded or limited. The fiber optic strands are collected into a pigtail (6) which terminates at the rear of the tile (2) as shown in FIGS. 2B and 2C. This surface is then polished and optically coated for optimal image coupling. The tile assembly (2) may be filled with expanding foam that serves both to insulate and protect the fiber optic strands enveloped therein.

On the surface of the display (3), the fiber terminals (5) are located so that they are slightly recessed with respect to the tile surface as illustrated in FIG. 2B, and are affixed with optical epoxy (e.g., EpoTek 301). A light-shaping diffusion film, preferably a holographic diffusion film with very high optical transmission and low back-scattering, is then applied to the display surface (3) of each tile (2). The diffusion film is stamped out in such a manner as to leave between 30–70% of the tile surface exposed, as illustrated in FIG. 2A. The percentage of exposed tile surface is dictated by the lighting conditions in which the display (1) will be used. Displays (1) for indoor use can be depixelized more than displays to be used outdoors. The base material chosen for the tile (2) must be black, with a matte or stippled surface in order to enhance the contrast of the display by absorbing ambient light. Alternatively, a black, light-absorbing material may be attached or silk-screened onto the tile surface to achieve the same effect as illustrated in FIG. 2A. The pitch or spacing between adjacent distal fiber ends (5) is determined by the application, so that displays (1) to be used for proximal viewing will have a higher pixel density than displays (1) used for viewing at a distance. In the specific embodiment disclosed, the display surface (3) is designed with a matrix of orifices spaced 4 mm on center, so that pixel pitches in multiples of 4 mm may be used (e.g., 4 mm, 8 mm, 12 mm, 16 mm, etc.). The present invention uses a uniform 8 mm on-center pitch in both the vertical and horizontal axes. The distal fiber ends (5) on the perimeter of the tile are situated half of the pixel pitch, or 4 mm, from the tile edge, so that when multiple tiles are joined, the 8 mm pitch is preserved.

In an alternative and preferred embodiment of the present invention, the optical fibers (5) are replaced by solid transparent plastic (e. g., polycarbonate) arrays or "manifolds" of optical lightguides. These lightguides have several distinct advantages over plastic optical fiber. First, because the lightguides are manufactured in an injection-molding procedure, rather than a fiber drawing apparatus, the entire light "manifold" can be made as a single or several parts, eliminating the time and expense of inserting individual fiber ends (5) into the display tile (2). Second, because of the manufacturing procedure involved, the polycarbonate lightguides can be tapered, enhancing the overall appearance of the display. Formation of such tapered ends on optical fibers is a costly process. Third, lenses can be stamped, embossed, or molded onto the end of each lightguide, resulting in a more optically efficient, easier to assemble tile (2), and eliminating the need for a diffusion film to achieve wide-angle viewing.

Each tile (2) is designed with tabs (7) along each of its four sides as shown in FIG. 2 (edge tiles may have only three tabs (7), and corner tiles only two tabs (7)). The tabs (7) may be molded as appendages to each tile (2), or may be manufactured as separate items and attached to each tile (2) using hardware or adhesive; in either case they must be somewhat flexible to allow for curvature of the display surface (3). Each tile (2) is joined to its four (or two or three in the case of corners or edges) neighboring tiles (2) by means of compression clips (8) which are inserted around and over adjacent tabs (7). Alternatively, several different clip widths can be made which "force" the adjoining tiles (2) to be disposed at specific angles, although the curvature of the display surface (3) is determined primarily by the tile support and locator rods (16).

Mounted to each tile input surface is a micro-display (9)—a miniature spatial light modulator (SLM), commonly available as an OEM off-the-shelf product. Miniature SLM's typically have diagonal measurements of 0.25 inch to 1.3 inches. While emissive micro-displays (9) exist, such as field emissive displays (FED), vacuum fluorescent (VF), and organic light emitting diodes (OLED), these technologies are not currently able to produce the luminous flux levels needed for the present invention. In contrast to emissive technologies, modulated displays use an external light source and apply various electrical signals to liquid crystals and other materials to generate images. Modulated micro-displays (9) can be further categorized into transmissive and reflective displays. Transmissive displays employ a light source which passes white light through the LCD micro-display where it is modulated at each pixel to produce an image. Because of the transistor located at each LCD pixel, high density micro-displays (9) can have poor aperture ratios (percentage of light passing area to light blocking area), which must be considered when designing systems with high luminous flux. SLM resolutions from QVGA (320×240) to SXGA (1280×1024) are commonly available. Signal input (13) to each SLM (9) is generally provided by Low Voltage Differential Signaling (LVDS) or transmission-minimized differential signaling (TMDS). In order to increase the coupling efficiency between the input optical surface and the display tile (2) (i. e., the fiber optic bundle (5) or light pipes which communicate with the front of the display) and the SLM (9), a refractive microlens array (RMLA (10)) is used. The RMLA (10) essentially "fennels" incident light (from the micro-display (9)) so that it falls only on the core, not the cladding, of the optical fibers in the input bundle.

In addition to a video signal (13), each SLM requires a source of illumination (11) and electrical power (12). Various options are available for the illumination, depending upon the type of SLM used. Ferro-Liquid Crystal Displays (FLCD's, e.g., from Display Tech) and LCOS (Liquid Crystal on Silicon) displays, are field sequential, meaning that red, green, and blue light is sequentially strobed by the display electronics into the SLM. This can be achieved using an array of high-brightness LED's. SLM's such as active matrix TFT's (Thin Film Transistors) require collimated white light. This can be achieved with Cold Cathode Fluorescent (CCF) technology, full spectrum LED arrays, arc lamps, etc. For outdoor use, the SLM's must be able to handle large amounts of luminous flux. Thus, transmissive SLM's with large aperture ratios or highly efficient reflective SLM's are preferable.

Another embodiment of the present invention makes use of sunlight for illuminating the SLM's. A low cost heliostat can follow the sun's path during daylight hours and use a parabolic concentrator apparatus (19) to direct the sun's energy into a non-imaging fiber optic bundle or lightguide (17), where it is then distributed to each tile. Even inexpensive systems can deliver 200 W or 135,000 lumens @ 555 nm ("200 W Solar Energy Delivery with Optical Fibers", SPIE Vol. 3139, 1997). The solar power system could also be used to charge a battery which would operate the display system (1) when sunlight is not available. Solar powered display system are ideal for outdoor billboards and in areas where there is plentiful sunlight throughout the year.

Figure 5:
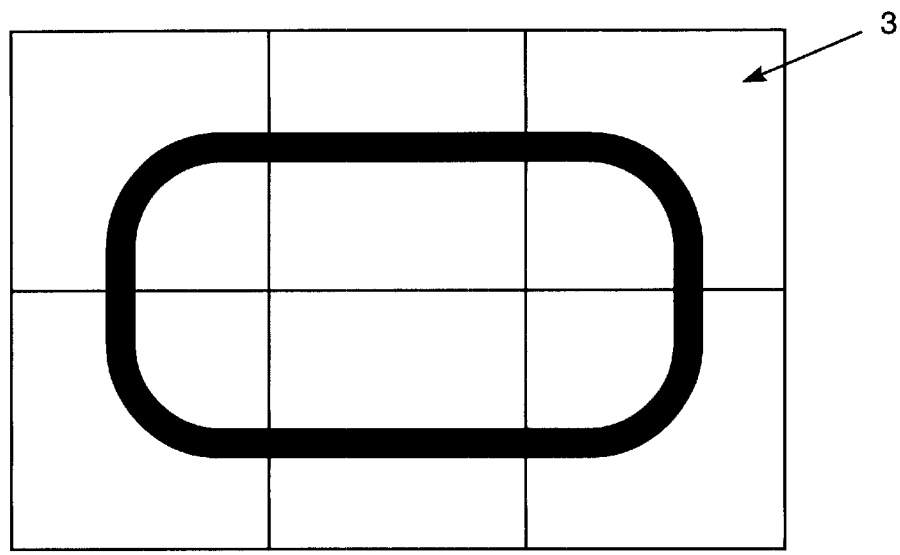
FIG. 5 shows how a video or graphic image is segmented to drive independent micro-displays (9).
Figure 5:
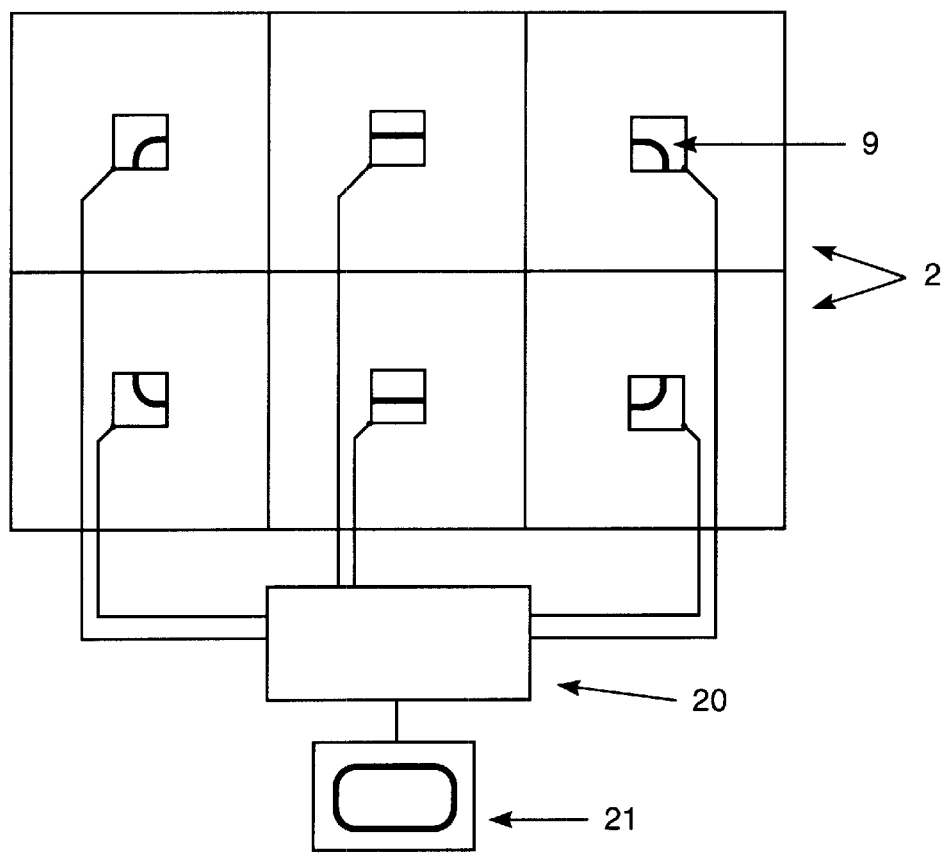

The image signal (13) for each SLM is a segment of the input signal to the display electronics. A computer image or other source image (21) is divided by the number of tiles (2) comprising the display (1). For example, FIG. 5 shows a 2×3, or six-tile display (1). A standard off-the-shelf video wall processor may be employed as an electronic circuit (20) for segmenting images among said micro-displays (9) in the form of a video splitter (20). The image source (21), whether a computer, DVD, or video feed, and video splitter (20) are preferably disposed in a separate enclosure.

Figure 3:
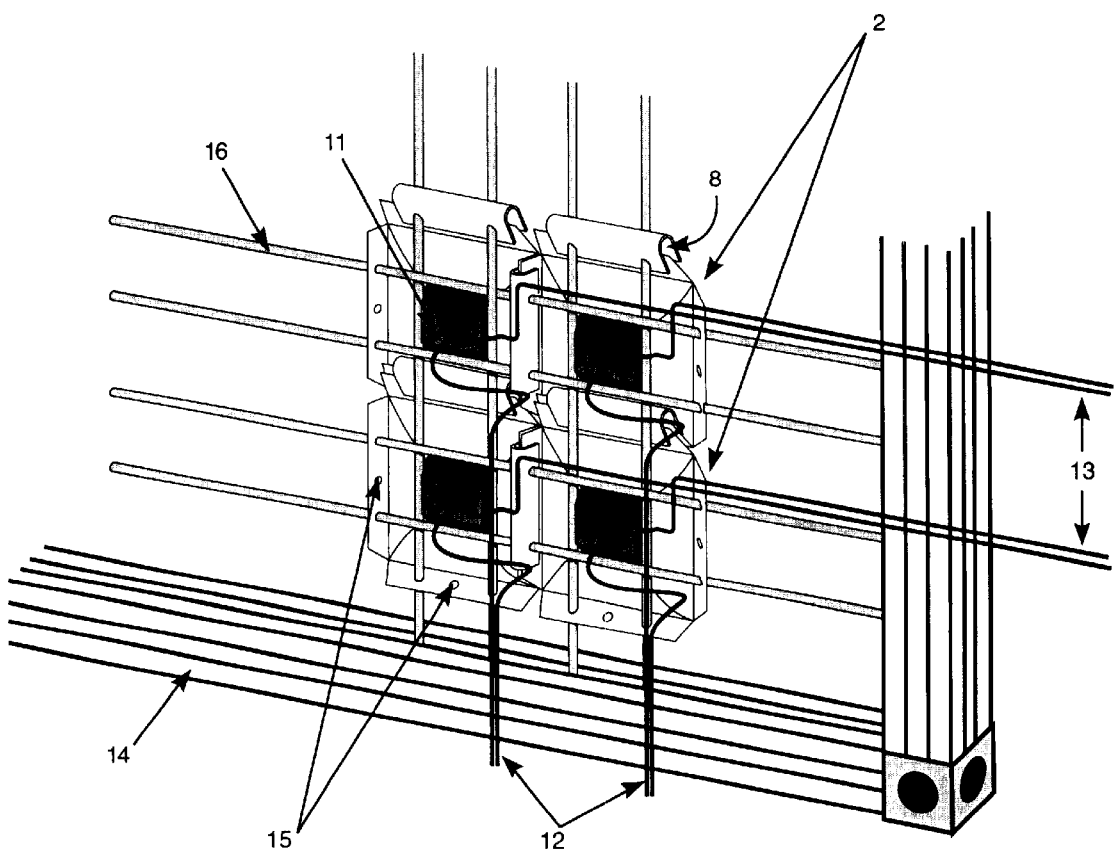
FIG. 3 shows a rear perspective view of a modular display (1), showing how the display tiles (2) are attached to each other and how they are mounted to a supporting frame (14).

A structural frame (14) may be used in non-permanent applications. Such a frame (14) may be constructed of extruded or tubular aluminum, plastic, or other suitable material. Each display tile (2) has a series of vertical and horizontal locator passages (15) through which flexible locator rods (16) pass. Alternatively, the locator passages (15) can be formed into the compression clips (8) that are used to attach adjoining tiles (2) as shown in FIGS. 2B, 2C, and 3. The locator rods (16) can then be attached to the top, bottom, and two sides of the structural frame (14) as illustrated in FIG. 3.

Figure 4A:
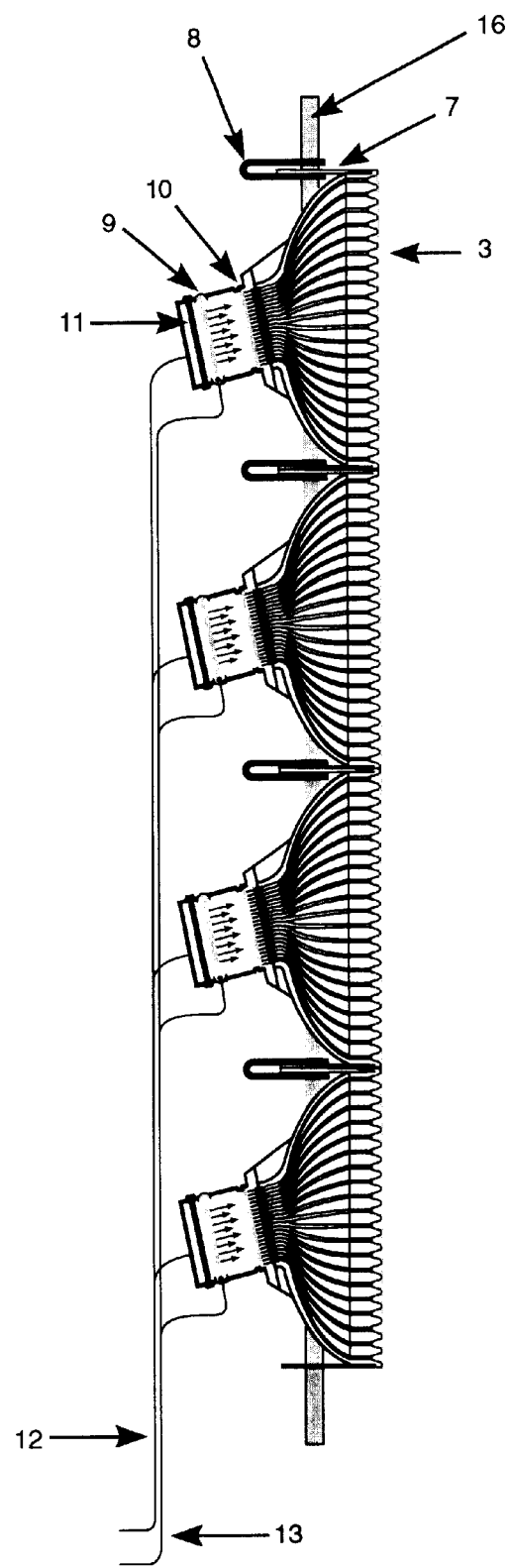
FIG. 4A shows a side view of the preferred embodiment of a complete electro-optical display (1), including tiles (2), micro-displays (9), illumination system (11), and display surface (3). An alternative embodiment is depicted in FIG. 4B where the individual light sources for each tile (2) are replaced by a single high-output light (18) source which pumps light to each tile (2) through an optical lightguide (17).
Figure 4B:
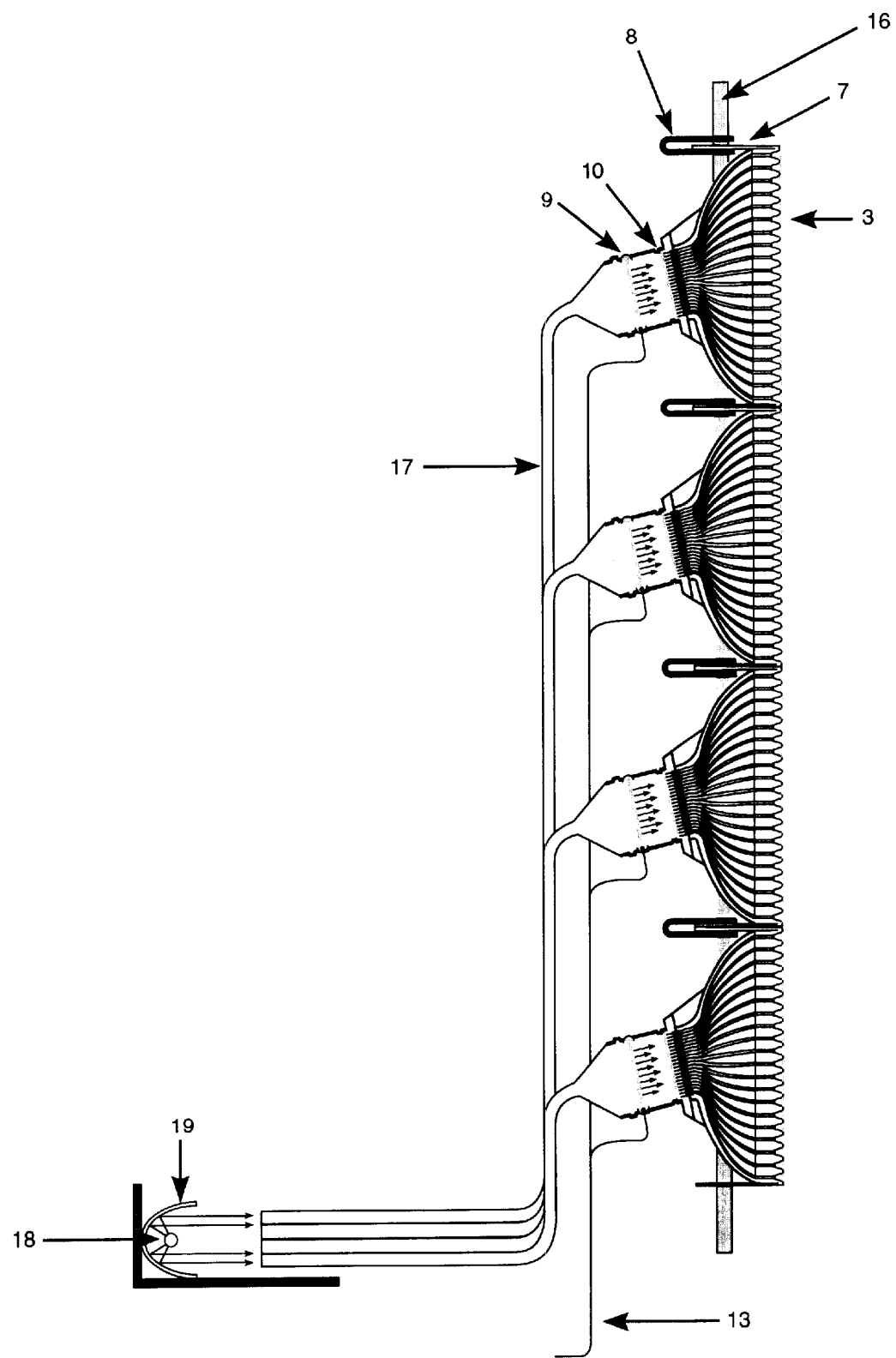

FIG. 4A is a diagram of the preferred embodiment of a complete LSD system (1), including tiles (2), micro-displays (9), illumination systems (11), and display surface (3). An alternative embodiment (FIG. 4B) uses optical lightpipes or light guides (17) to transport white light from an arc lamp illumination source (18) or other high intensity, concentrated light source, further concentrated by a parabolic or other reflector (19), to the array of micro-displays (9).

The fiber optic display screen of the present invention provides a novel method for forming modular contoured or planar displays (1) from small, inexpensive, self-contained tiles (2), utilizing micro displays (9), while still maintaining uniform viewing from any position or angle. Moreover, the display is rugged and portable. Although specific embodiments are disclosed herein, such embodiments are not intended to limit the scope of the following claims.

We claim:

1. An electro-optical display system (1) consisting of a plurality of tiles (2); and a plurality of micro-displays (9) cooperating with said tiles (2) with a means of illumination (11) of said micro-displays (9) and an electronic circuit (20) for segmenting an image source (21) among said micro-displays (9) for the purpose of conveying and in general enlarging images, including:

(a) a display surface (3);
   (b) a connecting means between said micro-displays (9) and the display surface (3);
   (c) a means of connection between tiles (2) in order to form a multiply-contoured or planar display surface of virtually any size and/or shape;
   (d) a structural frame (14) and matrix of horizontal and vertical locator rods (16) which attach to display tiles (2) to provide stability to the display (1).

2. The display (1) of claim 1 in which the connecting means between the micro-displays (9) and the display surface (3) is comprised of optical fibers (5).

3. The display (1) of claim 2 in which the distal fiber optic ends (5) are recessed in orifices (4) in the display surface (3) such that the point of light emitted from each distal fiber end (5) is enlarged by a holographic diffusion film or similar type of light-shaping diffusion film on the display surface (3).

4. The display (1) of claim 1 in which the connecting means between the micro-displays (9) and the display surface (3) may, in the alternate, be optical lightguides or a combination of optical fibers (5) and optical lightguides.

5. The display (1) of claim 1 in which the structural frame (14) consists of tubular or extruded metal or plastic or fiber-reinforced composite material elements to which are attached flexible horizontal and vertical locator rods (16) which provide structural stability to the surface created by joining the display tiles (2).

6. The display (1) of claim 1 in which the display tiles (2) are square, rectangular, or in general, polygonal in shape with flexible tabs (7) on each side.

7. The display (1) of claim 1 in which the means of connection between tiles (2) are flexible tabs (7) on sides of the tiles (2), attached to adjoining tabs (and tiles) by compression clips (8), which allows for a multiply-contoured or planar display (1) of virtually any size and/or shape.

8. The display (1) of claim 1 in which each display tile (2) has one or more light-shaping diffusers disposed over the distal fiber ends (5) for the purpose of increasing an effective numerical aperture of the fibers and thus creating a uniform distribution of light irrespective of viewer position (viewing angle).

9. The display (1) of claim 1 in which the display surface (3) is partially or fully covered by a holographic diffusion film to act as a light-shaping diffuser.

10. The display (1) of claim 1 in which the electronic circuit (20) is a standard off-the-shelf video splitter (20) (image segmenter), and is used to segregate a single source image (21), whether moving or static, into multiple partial images which are then conveyed in order to each micro-display (9) and subsequently reconstituted as a single image on the display surface (3).

11. The display (1) of claim 1 in which the means of illumination (11) of said micro-display (9) is:

a) Cold Cathode Flourescent (CCF) lighting; or b) Light-Emitting Diode (LED) lighting; or c) Any other source of light of suitable intensity and color temperature.

12. The display (1) of claim 1 in which the means of illumination of said micro-displays (9) is in the alternative a high intensity light source (18), a reflector or concentrator of parabolic or other shape (19), or natural sunlight, and a plurality of non-imaging lightguides (17) or optical fiber bundles.

13. An electro-optical display system (1) consisting of a plurality of tiles (2) attached to each other by tabs (7) and clips (8) to form a display surface (3), having a holographic diffusion film, with a plurality of micro-displays (9) cooperating with said tiles (2) by means of optical fibers (5) connecting micro-displays (9) to the display surface (3), said optical fibers being recessed in orifices (4) in said display surface (3), such that a point of light from the optical fibers (5) is enlarged by a diffusion film on the display surface (3), with a means of illumination (11) of said micro-displays (9), and an electronic circuit (20) for segmenting images (21) among said micro-displays (9), and a structural frame (14) with locator rods (16) attached to said tiles (2) to provide stability to said display (1), for the purpose of conveying and in general enlarging images.

14. An electro optical display system (1) consisting of a plurality of tiles (2) attached to each other by tabs (7) and clips (8) to form a display surface (3), with a plurality of micro-displays (9) cooperating with said tiles (2) by means of solid molded lightguides, said lightguides being configured in arrays or manifolds to conduct light from said micro-displays (9) to said display surface (3), which arrays of lightguides also perforate said tiles (2) and are affixed to said tiles (2) such that the lightguide emitters form a portion of the display surface (3), with a means of illumination of said micro-displays (9), and an electronic circuit (20) for segmenting images (21) among said micro-displays (9), and a structural frame (14) with locator rods (16) attached to said tiles (2) to provide stability to said display (1), for the purpose of conveying and in general enlarging images.

* * * * *